United States Patent [19]

Hill

[11] Patent Number: 5,592,521
[45] Date of Patent: Jan. 7, 1997

[54] PROCESS AND DEVICE FOR RECOMBINING AND/OR IGNITING HYDROGEN CONTAINED IN AN $H_2$-AIR-STEAM MIXTURE, PREFERABLY FOR NUCLEAR POWER STATIONS

[75] Inventor: Axel Hill, Stockstadt, Germany

[73] Assignee: Siemens Aktiengesellschaft, Munich, Germany

[21] Appl. No.: 484,520

[22] Filed: Jun. 7, 1995

Related U.S. Application Data

[62] Division of Ser. No. 189,304, filed as PCT/DE92/00612, Jan. 28, 1994, published as WO93/03489, Feb. 18, 1993, Pat. No. 5,492,686.

[30] Foreign Application Priority Data

Jul. 29, 1991 [DE] Germany .......................... 41 25 085.0

[51] Int. Cl.⁶ .................................................. G21C 9/06
[52] U.S. Cl. ........................................ 376/301; 423/580.1
[58] Field of Search ........................ 376/301; 423/580.1; 422/182, 198

[56] References Cited

U.S. PATENT DOCUMENTS

| | | | |
|---|---|---|---|
| 1,272,181 | 7/1918 | Andreucci | 423/580.1 |
| 3,243,631 | 3/1966 | Clark | 313/141 |
| 3,707,831 | 1/1973 | Dautzenberg et al. | 422/181 |
| 3,755,075 | 8/1973 | Henrie | 423/580.1 |
| 4,741,879 | 3/1988 | McLean et al. | 376/301 |
| 4,911,879 | 3/1990 | Heck et al. | 376/301 |
| 5,230,859 | 7/1993 | Wiesemes | 376/301 |

FOREIGN PATENT DOCUMENTS

| | | |
|---|---|---|
| 0233564 | 8/1987 | European Pat. Off. . |
| 0303144 | 2/1989 | European Pat. Off. . |
| 0416140 | 3/1991 | European Pat. Off. . |
| 3929327 | 10/1990 | Germany . |
| 4015228 | 11/1991 | Germany . |
| 1368023 | 1/1988 | U.S.S.R. . |
| 858079 | 1/1961 | United Kingdom ................ 423/580.1 |

*Primary Examiner*—Daniel D. Wasil
*Attorney, Agent, or Firm*—Herbert L. Lerner; Laurence A. Greenberg

[57] ABSTRACT

A first partial flow of an $H_2$-air-steam mixture is passed through a first channel and recombined by contact with a first channel wall having a catalytic coating. In addition to the first partial flow, a second partial flow of the mixture is passed through a second channel having a second channel wall and is ignited by being fed past preferably metallic ignition elements being heated to the $H_2$ ignition temperature upon reaching or exceeding an ignition limit. Under these circumstances, heat liberated during the catalytic reaction in the first channel is at least partially transmitted to the second channel for the purpose of preheating it. The novel process functions both at the lower and at the upper ignition limit and recombines even at unignitable $H_2$ concentrations. A device with which the process can be carried out is also described.

25 Claims, 5 Drawing Sheets

PROCESS AND DEVICE FOR RECOMBINING AND/OR IGNITING HYDROGEN CONTAINED IN AN $H_2$-AIR-STEAM MIXTURE, PREFERABLY FOR NUCLEAR POWER STATIONS

CROSS-REFERENCE TO RELATED APPLICATION

This application is a division of application Ser. No. 08/189,304, filed Jan. 28, 1994, now U.S. Pat. No. 5,492, 686, dated Feb. 20, 1996; which was a continuation of international application PCT/DE92/00612, filed Jul. 28, 1992.

BACKGROUND OF THE INVENTION

Field of the Invention

The invention relates to a process for recombining and/or igniting hydrogen contained in an $H_2$-air-steam mixture and to a device for recombining and/or igniting the hydrogen contained in an $H_2$-air-steam mixture.

Such a process as well as such a device are disclosed in Published European Application No. 0 303 144 A1. In that case, a catalyst body is disposed in a vertically extending tube at a distance from an inner wall of the tube. End surfaces of the tube are provided with closures which open as a function of pressure and/or temperature. The catalyst material being used is preferably palladium or platinum, and a recombination takes place even in the range of unignitable hydrogen concentrations. Attached to the catalyst body are wires which have a catalytic coating or include such a material and which, as viewed in the flow direction of the $H_2$-air-steam mixture through the tube, may be disposed upstream and/or downstream of the catalyst body.

The invention proceeds from the insight that the process mentioned at the outset must not only function reliably during the recombination of unignitable hydrogen concentrations and effect a reliable ignition at the so-called lower ignition limit, but that a reliable ignition of the hydrogen in the incoming mixture must also be guaranteed at the upper ignition limit (a so-called rich mixture or $H_2$-air-steam mixture having a relatively high $H_2$ concentration).

This is important because, after the onset of cooling processes and condensation of the water vapor, inflow into the ignition region may take place at high $H_2$ concentrations.

SUMMARY OF THE INVENTION

It is accordingly an object of the invention to provide a process and a device for recombining and/or igniting hydrogen contained in an $H_2$-air-steam mixture, preferably for nuclear power stations, which overcome the hereinaforementioned disadvantages of the heretofore-known methods and devices of this general type and which make possible, for the purpose of the requirements stated above, a recombination and ignition of hydrogen not only at the lower ignition limit at about 4 to 5% by volume of hydrogen, but also at the upper ignition limit (at about 10% by volume of hydrogen or over), with this being the case even in an atmosphere containing water vapor, that is to say in an inertizing atmosphere.

With the foregoing and other objects in view there is provided, in accordance with the invention, a process for recombining and igniting hydrogen contained in an $H_2$-air-steam mixture, which comprises passing a first partial flow or current of an $H_2$-air-steam mixture through at least one first channel having a channel wall with a catalytic coating, and subjecting the first partial flow to a catalytic reaction for recombining $H_2$ and $O_2$ to form $H_2O$ by contact with the channel wall; in addition to the first partial flow, passing a second partial flow of the $H_2$-air-steam mixture through at least one second channel having a channel wall, and feeding the second partial flow past at least one ignition element being heated to an ignition temperature igniting the second partial flow upon at least reaching an ignition limit; and at least partially transmitting heat liberated during a catalytic reaction in the first channel to the second channel for preheating the second channel.

In this way, a result is achieved which is that the calorific heat can be reliably transmitted to the ignition element not only by being contingent upon extraneous energy sources, but as an inherent feature.

German Patent DE 39 29 327 C1 discloses a spark igniter for hydrogen for recombining it with oxygen at low hydrogen concentrations below the explosion limit. In that spark igniter the ignition spark gap is surrounded by a catalytically coated protective device. The heating of the protective device as a result of the catalytic combustion of the hydrogen is intended to reduce chemical termination reactions at the protective device and hydroxyl radicals produced as a consequence of the catalytic combustion are intended to contribute to the increase in ignitability of the hydrogen mixture. In contrast, the invention involves dividing the $H_2$-air-steam mixture containing hydrogen in two in order to achieve the heating up of the ignition element by the heat produced in the catalytic recombination in the first partial flow and, as a result, to achieve a better ignition of mixtures at the upper ignition limit.

In accordance with another feature of the invention, in order to transmit the heat liberated in the first channel, the second channel wall is brought into a heat-transmitting relationship, preferably into heat-conducting contact, with the first channel so that quantities of heat produced during the recombination processes in the first channel are transmitted to the second channel wall and the $H_2$-air-steam mixture flowing through the second channel is preheated at the second channel wall before or while it flows past the ignition element and is ignited at the latter. A heat-transmitting relationship is understood as meaning that the heat is transmitted, or can be transmitted, from the first channel to the second channel and the ignition element(s) by heat radiation, by convection and by heat conduction, with the heat conduction through the channel walls accounting for a substantial proportion of the transmission. It has been found that, surprisingly, the second metallic channel wall itself can be used as a panel-type ignition element. The second metallic channel wall then functions as a large-area thermal igniter. Due to the catalytic recombination processes proceeding in the first channel and due to the transmission of the heat produced under these circumstances, it is possible to heat the second metallic channel wall to temperatures of, for example, 700° to 720° C. Such a thermal igniter preferably functions at the upper ignition limit and does so very efficiently at that point. In addition to or instead of the panel-type ignition element(s), one or preferably more point-type ignition elements having discrete ignition points which project into the gas flow path of the second partial flow may also be used. When constructed as thin wires or "filaments" having a catalytic coating (for example Pt or Pd), such point-type ignition elements preferably function as catalytic igniters at the lower ignition limit. When constructed as uncoated tubes or wire coils with good heat conduction, for example, including Cu, such point-type ignition elements may also be used as thermal igniters.

In accordance with a further feature of the invention, the first partial flow is fed essentially vertically from the bottom upwards in the first channel, so that the associated volumetric flow is stabilized by thermally generated lifting forces. In accordance with an added feature of the invention, the second partial flow is fed essentially vertically from the bottom upwards in the second channel, so that the associated volumetric flow is stabilized by thermally generated lifting forces. This produces convection flows in the first and second channels and the pressure waves produced by ignition in the second channel are unable to disturb the convection flows permanently or, for instance, reverse their flow direction.

In accordance with an additional feature of the invention, in order to increase the dwell time, the second partial flow is throttled.

In accordance with yet another feature of the invention, the first and second partial flows emerging from the first and second channels are fed separately from one another along a separating section which is long enough to prevent the first partial flow on the outlet side from entering the second channel and the second partial flow on the outlet side from entering the first channel.

The advantages achievable with the process according to the invention are to be perceived, in particular, in the following:

$H_2$ ignition at the lower ignition limit ($O_2$ excess, $H_2$ deficiency) of $H_2$-air-steam mixtures, $H_2$ ignition at the upper ignition limit ($H_2$ excess, $O_2$ deficiency) of $H_2$-air-steam mixtures, appreciable $H_2$ and $O_2$ recombination to form $H_2O$ in the range of unignitable concentrations and therefore use of the process not only for igniting, but also for large-area recombination, possibility of use, in particular, in nuclear engineering, and also in the chemical and petrochemical industry, to name only a few examples.

With the objects of the invention in view, there is also provided a device for recombining and/or igniting the hydrogen contained in an $H_2$-air-steam mixture, comprising at least one first channel including a channel wall having a wall surface with a catalytic coating for recombining hydrogen and oxygen flowing past; at least one second channel, in addition to or parallel to the first channel, including a channel wall having at least one preferably metallic ignition element to be heated to an ignition temperature for igniting ignitable $H_2$-air-steam mixtures flowing past; and means for coupling heat produced in recombination processes in the first channel into the second channel.

Other features which are considered as characteristic for the invention are set forth in the appended claims.

Although the invention is illustrated and described herein as embodied in a process and a device for recombining and/or igniting hydrogen contained in an $H_2$-air-steam mixture, preferably for nuclear power stations, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED OF THE PREFERRED EMBODIMENTS

Figure 1:
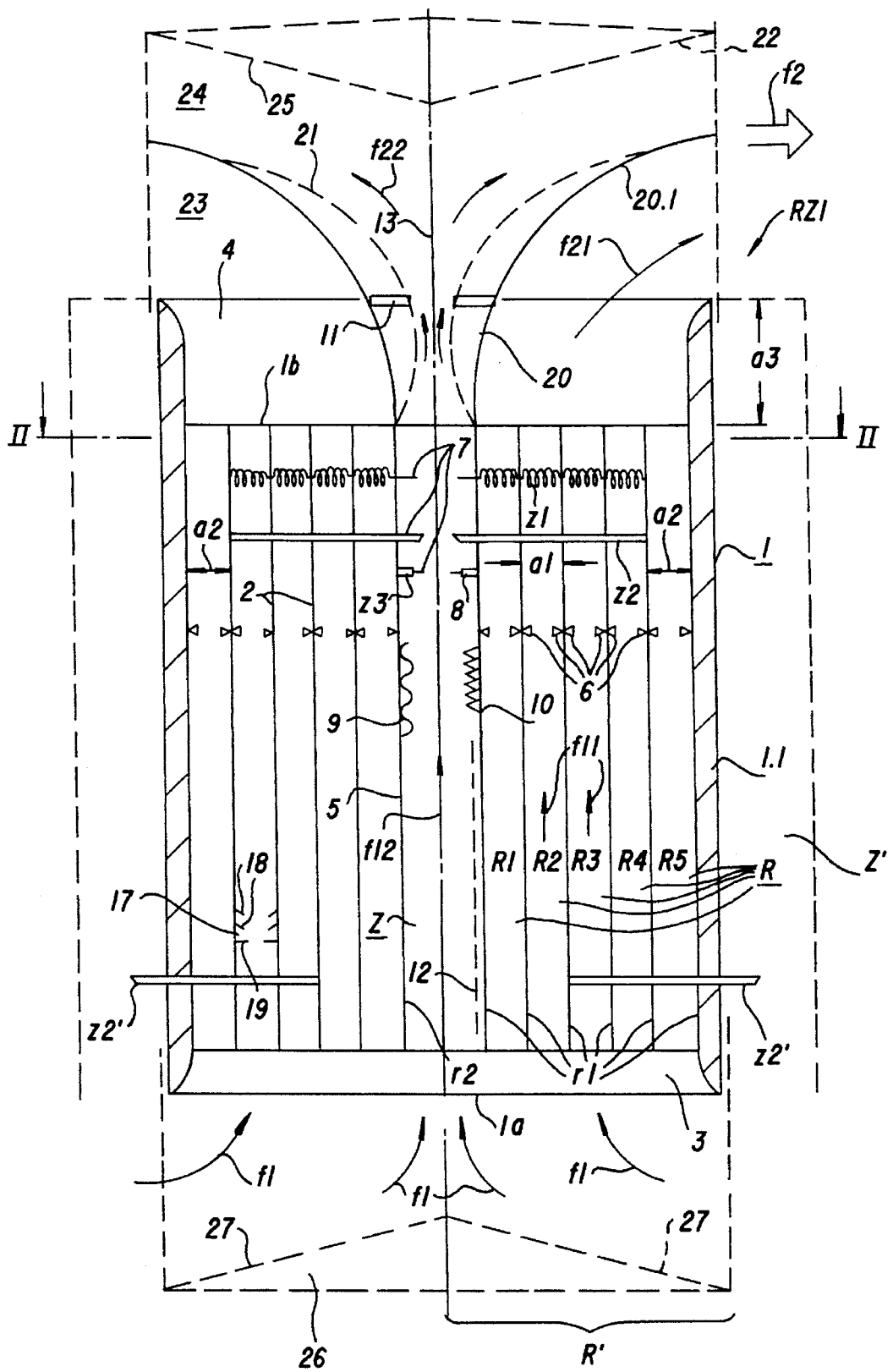
FIG. 1 is a basic diagrammatic, longitudinal-sectional view of a device according to the invention which is suitable for implementing the process, and a second structure with an external second channel being indicated in an outer circumferential region of the device shown in FIG. 1.
Figure 2:
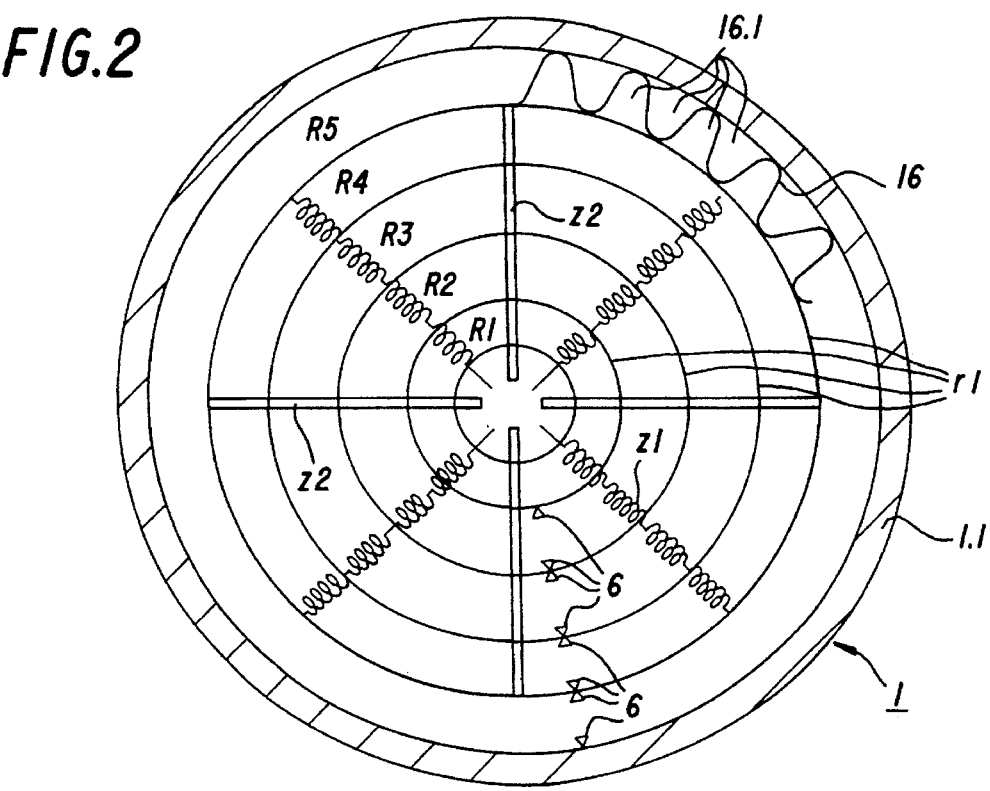
FIG. 2 is a cross-sectional view taken along a line II—II of FIG. 1, in the direction of the arrows.

Referring now to the figures of the drawing in detail and first, particularly, to FIGS. 1 and 2 thereof, there is seen a first embodiment RZ1 of a device according to the invention, in which concentric, annular metal sheets 2 are disposed in a tubular housing 1, in each case at a distance a1 from one another and at a distance a2 from a wall surface of the housing 1. The tubular housing 1 is formed of stainless steel having a housing wall 1.1 with a wall thickness which may be from 1 mm to several millimeters for strength reasons. The housing 1 has a bottom end with an inlet opening 3 and a top end with an outlet opening 4 for an $H_2$-air-steam mixture which is symbolized by arrows f1 in the vicinity of the inlet opening 3. A first partial flow is symbolized by arrows f11 where the mixture flows through a first channel R and a second partial flow is symbolized by arrows f12 where the mixture flows through a second channel Z. At the outlet of the first and second channels R and Z, the corresponding partial flows are denoted by respective reference symbols f21 and f22 and by reference symbol f2 after they have been combined. The channels R and Z may be channel systems in each case having a plurality of subchannels or a single channel. The expression "channel systems" is therefore intended below to include both single channels and multiple-channel configurations if nothing more detailed is stated.

The first channel system R is bounded by first channel walls r1 or their wall surfaces, which are formed by the annular concentric metal sheets 2, the inner periphery of the housing wall 1.1 and the outer periphery of a central tube 5.

Arrow heads 6 pointing to the surfaces of the first channel walls or wall parts r1 indicate that the wall surfaces of the first channel walls r1, which are exposed to the first partial flow f11 of the mixture f1, have a catalytic coating for recombining hydrogen contained in the mixture f1. Palladium or platinum, and preferably platinum, has proved to be a suitable catalytic coating. These metals are fixed in finely divided form on a non-illustrated carrier layer of the first channel walls r1, which layer has an adequate surface roughness.

The second channel system Z already mentioned above is connected in parallel with the first channel system R and has at least one second channel wall or wall part r2, with a wall surface which is formed by the inner periphery of the central tube 5 and which is exposed to the second partial flow f12 of the mixture f1. The second channel system Z has ignition elements which are constructed as point-type ignition elements z1, z2 or z3 in the example shown in FIGS. 1 and 2. In the case of the ignition elements z1 which are constructed as wire coils and the ignition elements z2 which are constructed as pin-type or tubular ignition elements, it is typical that they are disposed in flow spaces, in this case in annular channels R1 to R4, of the first channel system R. The ignition elements z1 and z2 make metallic contact at least with one channel wall of the first channel walls r1 or the second channel wall r2 and have a point 7 which extends through the channel wall r2 of the second channel system Z into the channel cross section of the second channel system Z as point-type ignition elements. The ignition elements z3 are only in metallically conducting contact with the second channel wall r2. The ignition elements z1 and z2 pass through the second channel system Z (as is seen in FIG. 2), preferably on radii, and are therefore repeatedly exposed to the recombination heat produced in the channel system. The hot gas flows f11 produced during the recombination processes in the first channel system R first give up their heat directly to the ignition elements z1, z2 when they flow past the latter. However, they also heat the first channel walls r1, with which the ignition elements z1, z2 are in metallically conducting contact, with the result that heat is also transmitted to the ignition elements z1, z2 by heat conduction. In addition to the heat transmission due to convection and heat conduction, some of the heat is also transmitted to the ignition elements z1, z2 by heat radiation. Then the metallic cylindrical channel walls r1 act virtually as mirrors which throw the infrared heat radiation radially inwards so that not only is the particular inner first channel wall r1 irradiated by the particular outer first channel wall r1, but the second channel wall r2 is also heated up as the last link in this radiant-heat transmission chain.

In detail, the ignition elements z1 are formed of a coiled platinum wire. These ignition elements are used for catalytic ignition in the first channel system R and, because they project by means of one point 7 into the second channel system Z, they are also used for the catalytic and/or thermal ignition in the second channel system Z. The ignition elements z2 preferably are formed of copper tubes or rods and the point 7 of the latter preferably acts as a thermal igniter in the second channel system Z. The same applies to the ignition elements z3 which are constructed as point-type ignition elements and in which a point 7 is supported by a small solid metal block 8 that is attached, in turn, to the inner periphery of the central tube 5, for example by spot welding or by screw connection. The second channel walls r2 may even be used as panel ignition elements for thermal ignition, as is explained below with reference to FIGS. 3 and 4. In the example shown in FIGS. 1 and 2, this action is additional to the ignition action of the point-type ignition elements z1 to z3.

As is partially indicated for the central tube 5 by a corrugated line 9 and a zigzag line 10, the surface of the second channel system Z can be increased by corrugated or zigzag-shaped construction of the second channel wall r2. If, in addition to the corrugated-tube-type construction 9 or the construction 10 which is zigzag-shaped in cross section, the second channel wall r2 extends spirally or helically, this has the advantage of superimposing a rotary flow component on the second partial flow f12, thereby increasing the dwell time of the second partial flow inside the second channel system. Such a wall construction incidentally achieves a throttle action. Such an action can also be achieved by a flow throttle 11 that is separately fitted at the outlet end of the second channel system Z.

The second channel wall r2 may be partially provided with a catalytic coating 12, preferably of Pt or Pd, as is indicated by a broken line. Preferably, however, only the first channel system R has the catalytic coating 6 of the wall parts.

As was already indicated, in order to form the first channel system R, the cylindrical metal sheets 2 of various diameter are disposed coaxially around a tube axis 13 and concentrically with one another inside the hollow cylindrical housing wall 1.1, with the inlet and outlet openings 3, 4 being disposed at end surfaces of the cylinder. In order to retain and space the cylindrical metal sheets 2, intermediate metal sheets 16 seen in FIG. 2 are used, as is explained below.

Figure 5:
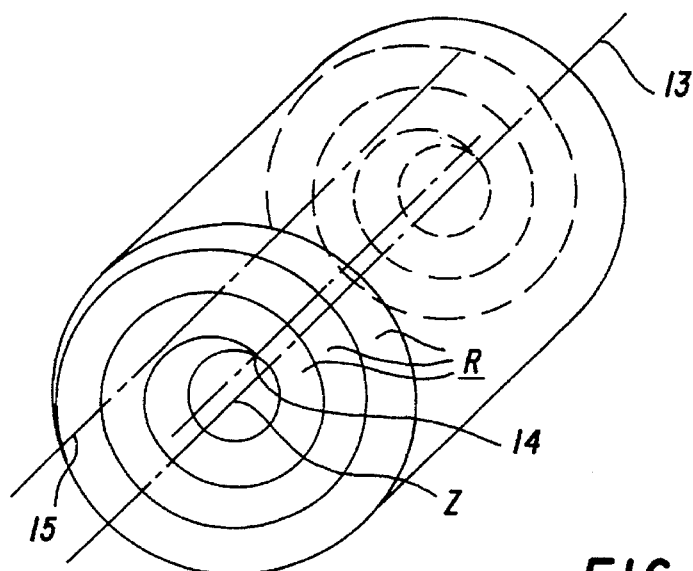
FIG. 5 is a simplified, perspective view of a device constructed from a spirally wound metal sheet, in a horizontal position (whereas a working position is an upright position)

According to a modification of the first exemplary embodiment shown in FIGS. 1 and 2, in order to form the first channel system R, metal sheets that are wound spirally and at a distance from one another may also surround the central housing axis 13 inside the hollow cylindrical housing wall 1.1, with the inlet and outlet openings 3, 4 being disposed at the end surfaces of such a spiral. In the structure shown, the second channel system Z is bounded by the inner periphery of the innermost cylindrical metal sheet in the form of the central tube 5. In a spirally-wound first and second channel system, it is expedient to form the boundary of the second channel system Z by means of the inner periphery of the innermost spiral winding of the spirally wound metal sheets, as is shown diagrammatically in FIG. 5, in which case the beginning and the end of the spirally wound metal sheet should be joined to the adjacent sections of metal sheet, expediently by a weld seam or a series of respective spot welds 14 or 15 in each case.

Returning to the exemplary embodiment shown in FIGS. 1 and 2, in order to increase the catalytic surface and to stabilize the flow, it is advantageous to place the catalytically coated, corrugated intermediate metal sheets 16 in at least one, in a plurality of, or in all of the annular channels R1 to R5, as is shown in FIG. 2 in a circumferential subsection of the annular channel R5. The advantage of this additionally provided, corrugated intermediate metal sheet 16 is that, together with the cylindrical metal sheets 2, it can form an attachment system for the first channel walls r1 if the respective corrugated intermediate metal sheet 16 and the cylindrical metal sheets 2 are joined together by welding, brazing or bonding to the housing wall 1.1 and to the central tube 5. A multiplicity of subchannels 16.1 is formed by the intermediate metal sheets 16 and the metal sheets 2.

The central tube 5 has a catalytic coating only on its outer periphery, whereas on its inner periphery, it may be partially provided with the catalytic coating 12 mentioned above and in addition with an oxygen-donating material. As in the second channel system Z, turbulence-increasing means, for example in the form of so-called turbolators 17, may be provided in the first channel system R. These are internals or baffles inside the annular spaces R1 to R5 in the form of louver-type strips 18 having leading edges which are directed against the flow direction. Orifice-plate type internals 19, which are inserted upstream of the strips 18 when viewed in the flow direction, can also be used as turbolators 17 in conjunction with the louver-type strips 18. This increases the flow velocity locally and improves the vortex effect due to the strips 18.

According to a second, modified embodiment, the second channel system Z may also be disposed in an annular space at the outer periphery of the device. This alternative second channel system is denoted by reference symbol Z' and is indicated by broken lines. A first channel system R' is accordingly formed by the annular spaces R1 to R5 and the internal space of the central tube 5. In this case, the ignition elements, for example the rod-type or tubular ignition elements z2, would be oriented from the inside outwards and would project into the outer annular space of the second channel system Z', as is seen by ignition elements z2'. However, this alternative embodiment would have to be insulated thermally at its outer periphery so that too much heat would not be lost to the outside from the second channel system Z', especially by radiation. The first construction having first channel system R and second channel system Z surrounded by the first channel system, as is shown in FIGS. 1 and 2, is therefore preferred.

As was already explained, the inlet opening 3 for the first and second channel systems R, Z is situated at a bottom, open end surface 1a of the housing 1 and the outlet opening 4 is situated at a top, open end surface 1b of the housing 1, with the annular spaces R1 to R5 and the central tube 5 also being open correspondingly at their two end surfaces. Adjoining the inner metal-sheet channel of the central tube 5, which forms the second channel system Z, is a trumpet-type outlet diffuser 20. Inside the outlet diffuser 20 is an orifice for the flow throttle 11 at a point which is at a distance a3 from the inlet end of the diffuser that is about one third of the total axial length of the diffuser 20. The flow throttle 11 may be part of a venturi tube 21, as is shown by broken lines. In this case, the venturi tube 21 is expediently incorporated in the outlet diffuser 20.

As is indicated diagrammatically, the outlet opening 4 is covered by a lid 22 that is disposed at a vertical distance from it and is shown diagrammatically and by broken lines, in such a way that a lateral outflow cross section 23 is left free for the first channel system R and an outflow cross section 24 is provided for the second channel system Z. The lid 22 has (first) flow guiding surfaces 25 for promoting the deflection of the flow from the vertical direction (indicated by the flow arrows f11 and f12) to the horizontal direction (indicated by the flow arrow f2). A (second) flow guiding body 26 which has flow guiding surfaces 27 for deflecting the inflow of the mixture from the lateral to the vertical direction, as is made clear by the arrows f1, is also shown in FIG. 1 underneath the inlet opening 3. The trumpet-type outlet diffuser 20 has the effect of feeding the first and second partial flows f21, f22 emerging from the first channel system R and the second channel system Z separately from one another along a separating section in accordance with an arc-shaped outlet diffuser contour 20.1. The separating section is of such a length that the first outlet-side partial flow f21 is prevented from entering the second channel system Z and the second outlet-side partial flow f22 is prevented from entering the first channel system R.

Figure 4:
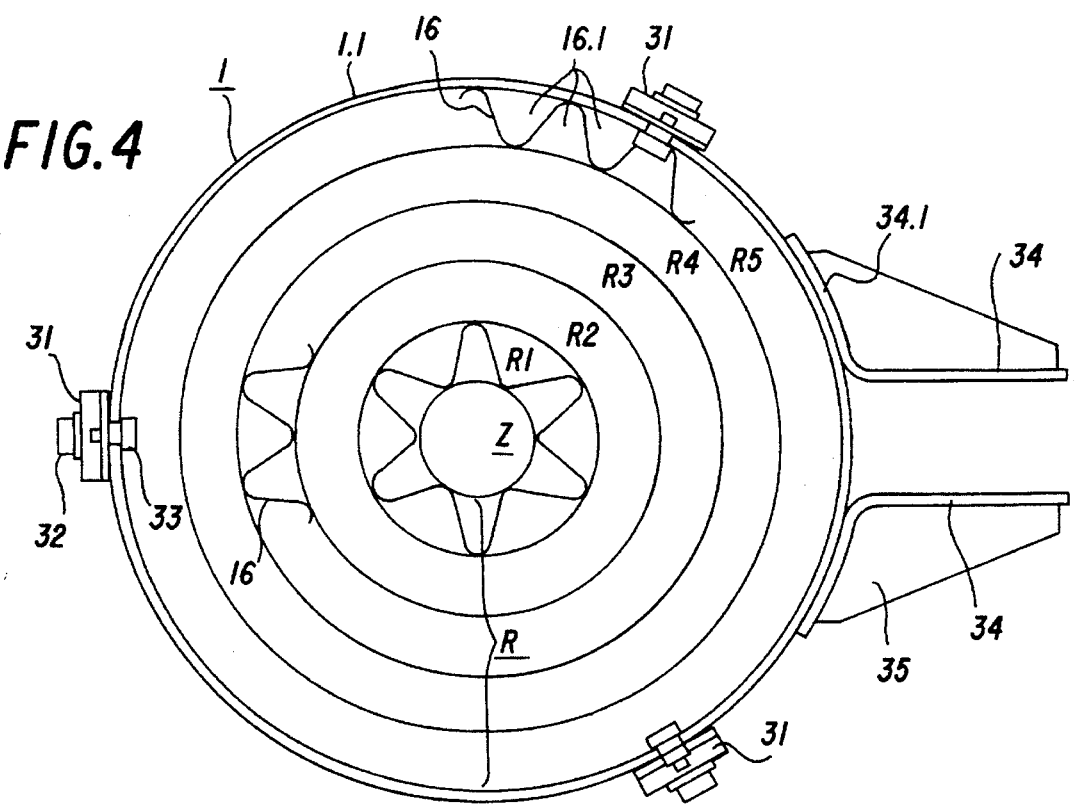
FIG. 4 is a cross-sectional view taken along a line IV—IV of FIG. 3, in the direction of the arrows.
Figure 3:
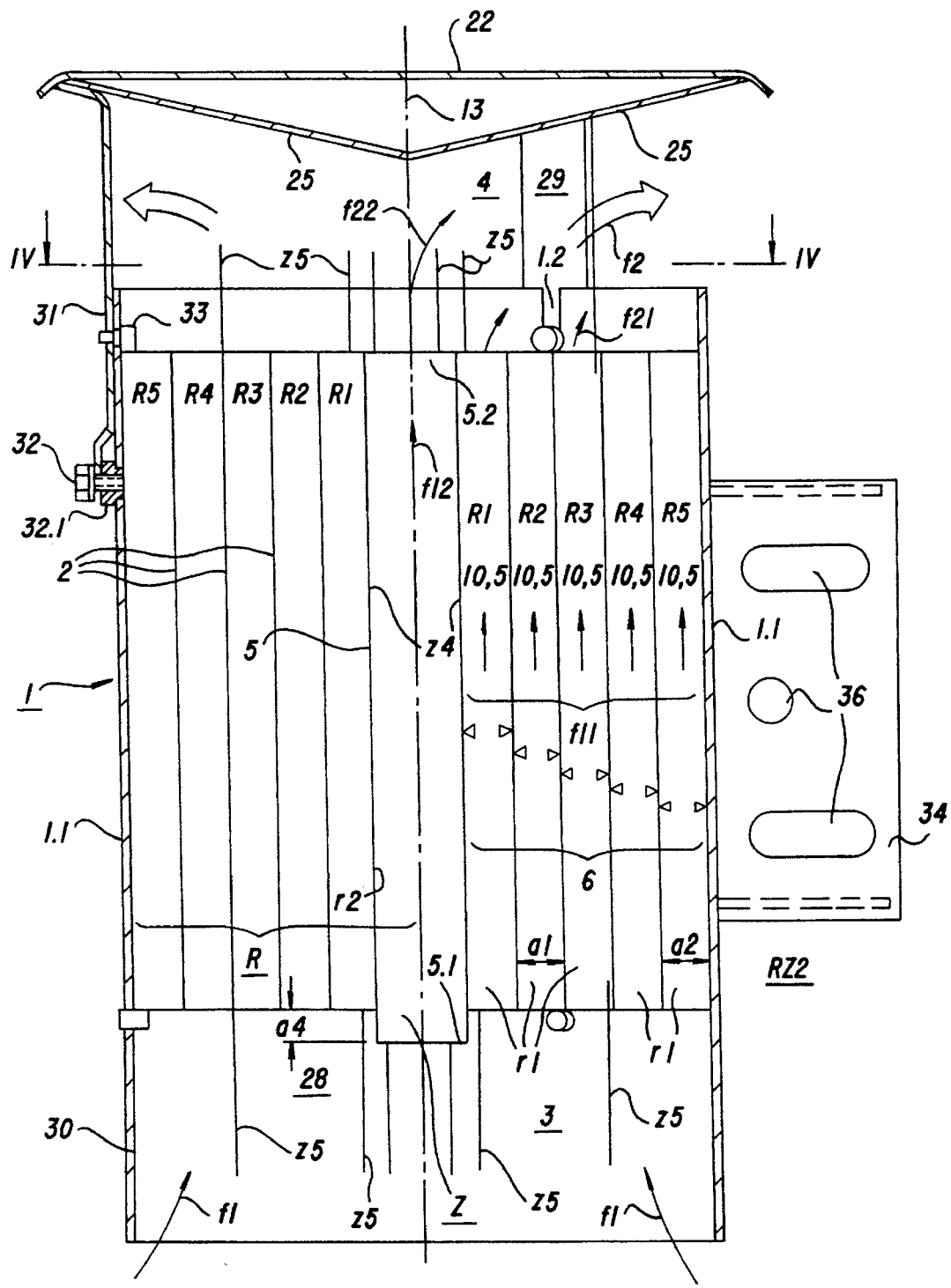
FIG. 3 is a detailed, longitudinal-sectional view of a third exemplary embodiment in the form of a modification of the device shown in FIG. 1.

The second basic exemplary embodiment of a device according to the invention which is shown in FIGS. 3 and 4 resembles that shown in FIGS. 1 and 2 in its basic structure, for which reason identical parts are also provided with identical reference symbols. Differences are present in the construction of the ignition elements and in that the region of the inlet opening 3 and the region of the outlet opening 4 have been structurally simplified. An ignition element z4 in the form of a panel-type ignition element which functions as a thermal igniter is formed by the second channel wall r2 of the second channel system Z. The mechanically firm cohesion of the cylindrical metal sheets 2, the central tube 5 and the housing 1 or its wall 1.1 is again achieved by the use of corrugated intermediate metal sheets 16 (seen in FIG. 4) that are catalytically coated on either side, in the respective annular spaces R1 to R5, and by joining the intermediate metal sheets 16 to the adjacent metal sheets 2 or the central tube 5 by welding, hard soldering or bonding, and preferably by spot welding. The central tube 5 for the second channel system Z has an inflow end 5.1 with a small projecting length a4 which may be 8 mm, for example, that reduces or avoids a retroaction of the ignition processes in the second channel system Z on the first channel system R. The panel ignition elements z4 function (as mentioned) as thermal igniters at the upper ignition limit. In addition to the panel ignition elements z4, the second channel system Z has thin wires which have a catalytic surface and preferably are formed of platinum, as point-type ignition elements z5. These ignition elements make metallic contact with the second channel wall r2, specifically at the inflow end 5.1 of the central tube 5, and they therefore project downwards into an inflow space 28. Preferably, an outflow end 5.2 of the central tube 5 or the second wall part r2 has further point-type ignition elements z5 and these elements make metallic contact with the central tube 5 for this purpose. These point-type ignition elements z5 are therefore aligned vertically upwards like antennae and project into an outflow space 29. Others of these point-type ignition elements z5 are attached in the form of thin platinum wires or "filaments" to the metal sheets 2 of the first channel system R at least at one end, preferably both in the vicinity of the inflow chamber 28 and in the vicinity of the outflow chamber 29. The ignition elements z5 function in the region of the lower ignition limit of the hydrogen contained in the mixture f1.

The device shown in FIGS. 3 and 4, which is denoted in its entirety by reference symbol RZ2, has a bottom cylindrical skirt 30, which surrounds the inflow chamber 28 and forms a continuation of the housing wall 1.1. A top end of the outflow chamber 29 is again covered by a lid 22 which is held by means of three supporting struts 31 that are distributed uniformly over the periphery. The supporting struts 31 are applied to the outside of the housing wall 1.1 at its top rim and are fastened by screwing, as is seen by two screw joints having top and bottom screws 32 and 33 that are provided per holding strut 31. The top screws 33 pass through the housing wall 1.1 into slots 1.2, while the bottom screws 32 press angled ends of the supporting struts 31 against threaded bushes 32.1 which are attached to the outside of the housing wall 1.1. In order to attach the device RZ2 to a holding structure, such as a non-illustrated vertical girder, two supporting flanges 34 are provided which are spaced apart from one another and which are each secured by welding to the outer periphery of the housing wall 1.1 by means of an arc-shaped piece 34.1. The arc-shaped pieces 34.1 seen in FIG. 4 and the supporting flanges 34 are reinforced by a reinforcing metal sheet 35 that has an axis extended normal to the longitudinal axis 13. Both flanges 35 have attachment openings 36 which are in line with one another and are in the form of elongated holes or bores.

The metal-sheet thickness for the first wall parts r1 and the second wall parts r2 may be relatively small and, for example, in a range between 0.1 and 0.5 mm, depending on the size of the device. In the case shown, the central tube 5 has an inside diameter of 20 mm, and the radial spacings a1 and a2 for the device RZ2 are in each case 10.5 mm, the outside diameter of the housing 1 is 129 mm and the wall thickness of the wall 1.1 is 2 mm. Analogously to the device RZ1 shown in FIGS. 1 and 2, the cylindrical metal sheets 2 for the first wall parts r1 and the central tube 5 for the second wall parts r2 can be cylindrical bodies or alternatively they can include a spirally wound metal sheet (which is still more beneficial in production engineering terms), as is shown diagrammatically in FIG. 5.

The device RZ2 shown in FIGS. 3 and 4 functions as follows (the functional description also applying analogously to the device RZ1 shown in FIGS. 1 and 2):

In the case of an ignition at the upper ignition limit, at least 6% by volume of $O_2$ is required, which corresponds to a proportion of air of just under 30%. In the case of an ignition at the lower ignition limit, at least 4 to 7% by volume of hydrogen is required, whereas the upper ignition limit is characterized in terms of the hydrogen content by the fact that the mixture f1 must contain at least about 10% by volume of $H_2$. The residual component in the mixture includes water vapor and air, as is shown by known three-component diagrams, of which one is shown, for example, in FIG. 8 of German Published, Non-Prosecuted Application DE 40 15 228 A1. In the first channel system R, the inflowing mixture f1 is recombined if the proportion of $H_2$ in it is below the lower ignition limit (that is to say below approximately 4–7% by volume). Under these circumstances the first channel walls or wall parts r1 heat up. If the proportion of $H_2$ rises to the lower ignition limit, catalytic ignition processes which are initiated by the ignition elements z5 (or in the example shown in FIGS. 1 and 2 by the catalytic ignition elements z1) occur in the first channel system R. The heat produced in this process is transmitted to the second channel system Z, as described. As a result, the temperature in the second channel system Z or at the second channel walls or wall parts r2 of the central tube 5 rises to values above 700° C. in a period of about 1 to 5 minutes. The second partial flow f12, which flows through the second channel system Z and which is still not recombined, is then thermally ignited by the second wall parts r2. At the upper ignition limit already mentioned above, the device RZ2 functions as a thermal igniter, i.e. the energy contained in the first partial flow f11 is converted essentially adiabatically into heat at the first wall parts r1. This heat is transmitted from the wall parts r2 of the central tube 5, which do not have a catalytic coating, to the unrecombined mixture f12, which is heated in this way until it reaches the spontaneous ignition temperature. At the lower ignition limit, the device RZ2 (and analogously RZ1) no longer functions as a thermal igniter since the energy contained in the low-$H_2$ gas mixture f1 is no longer adequate to reach the spontaneous ignition temperature inside the device in view of the heat transmission losses. The ignition elements z5 then take over the ignition function instead of the second wall parts r2. At certain points, these ignition elements, which are preferably constructed as Pt wires or filaments, feed to a very small gas volume an amount of energy (so-called hot spot) which is so high that the ignition temperature is reached in the volume. This catalytic ignition function at a relatively low proportion of $H_2$ in the order of magnitude of 4 to 7% proceeds at a low proportion of steam. Ignition can be carried out in an $H_2$-air mixture without steam in the range between 4 and 7% by volume of $H_2$ with the device. $H_2$-air-steam mixtures up to about 30% by volume of steam can be catalytically ignited with a proportion of $H_2$ of at least 8% by volume. Beginning with 40% by volume of steam, more than 10% by volume of $H_2$ is needed for a thermal ignition and the catalytic ignition then no longer functions.

From the above it becomes evident that the invention provides a process for recombining and/or igniting hydrogen contained in an $H_2$-air-steam mixture, wherein the following process features are characteristic of the method:

a) a first partial flow f11 of the $H_2$-air-steam mixture f1 is passed through a first channel system R and subjected to a catalytic reaction for recombining $H_2$ and $O_2$ to form $H_2O$ by contact with first, preferably metallic, channel walls r1 having a catalytic coating 6. This may be a recombination (without catalytic ignition) or alternatively a catalytic ignition. This takes place at the so-called lower ignition limit and is initiated by the ignition elements z5 (device RZ2) or the ignition elements z1 (device RZ1).

b) A second partial flow f12 of the $H_2$-air-steam mixture f1 is passed in parallel with the first partial flow f11 through a second channel system Z having at least one second channel wall r2 and in this case is fed past at least one, preferably metallic, ignition element z4, z5 which is heated to the $H_2$ ignition temperature so that the second partial flow f12 is ignited upon reaching or exceeding the ignition limit. In the second channel system Z, a thermal ignition takes place at the upper ignition limit (at least 10% by volume of $H_2$), in particular with a high proportion of steam in the mixture f1, and with a low proportion of steam a mixed ignition may take place, i.e. thermal ignition with the ignition element z4 and catalytic ignition with the ignition elements z5. At the lower ignition limit, the second channel system Z may also function as a catalytic igniter if the mixture f1 contains no steam or only a small percentage of steam by volume and the proportion of $H_2$ is in the range between 4 and 7%.

In this system, the following process feature is also preferably used:

c) the heat liberated in the first channel system R is, at least partially, (which means as high a proportion as possible and with as small heat losses as possible) transmitted to the second channel system Z in order to preheat it. A particular advantage is that extraneous heating can be dispensed with.

An extraneous heating of the ignition element z4 is avoided by bringing it into a heat-transmitting relationship with the first channel system R so that quantities of heat produced during the recombination processes in the first channel system R are transmitted to the ignition element z4. As a result of the good heat-transmission properties of the device, it is possible to heat the second wall parts r2 to over 700° C. in a short time if catalytic ignition processes are proceeding in the first channel system R.

For this purpose, it is important that the second channel wall r2 is brought into a good heat-transmitting relationship with the first channel system R so that quantities of heat produced during the recombination processes in the first channel system R are transmitted to the second channel wall r2 and the $H_2$-air-steam mixture (which is not yet recombined) flowing through the second channel system Z is preheated and heated up at the second channel wall before or while it is ignited at the ignition element z4. This makes it possible for the second channel wall r2 itself to be used as a metallic panel ignition element. The function of the thermal ignition by the ignition elements z4 (and z2, z3 as in FIGS. 1 and 2) is advantageously supplemented by the catalytic ignition elements z5 (or z1 in FIGS. 1 and 2) so that a continuous transition from catalytic ignition to thermal ignition and vice versa can take place in the range between the lower and the upper ignition limits.

The first partial flow f11 in the first channel system R is essentially directed vertically from the bottom upwards so that the associated volumetric flow is stabilized by thermally generated lifting forces and thus forms a convection flow. This applies also to the second channel system Z, where the second partial flow f12 is directed essentially vertically from the bottom upwards. As is shown in FIG. 1, the second partial flow f12 can be incipiently throttled and rendered turbulent by corrugated construction. Separate throttles at the outlet end of the second channel system (that is to say the throttle orifice 11 shown in FIG. 1) are then generally not necessary. With sufficiently large volumetric flows, for which the device RZ2 shown in FIGS. 3 and 4 is provided, the outlet diffuser 20 (see FIG. 1) can be dispensed with.

The device RZ2 is a component which can naturally be constructed in various sizes. In the example shown in FIGS. 3 and 4, the axial length is 270 mm. The device therefore also fits into corners and niches inside the containment of a nuclear power station and can be installed there in a plurality or multiplicity of 100 to 300 units per containment, for example. It is advantageous, for example, to install a multiplicity of smaller devices in the vicinity of the reactor pressure container and the pumps and steam generator in the case of a pressurized water nuclear power station so that the hydrogen produced during a hypothetical malfunction can be recombined or combusted close to its point of production. The intermediate metal sheets 16 (FIGS. 2 and 4) substantially increase the available, catalytically coated surface of the device. It is therefore beneficial to provide these intermediate metal sheets inside all of the annular spaces R1 to R5 (apart from the fact that they fulfill a mechanical function as attachment elements).

Figure 7:
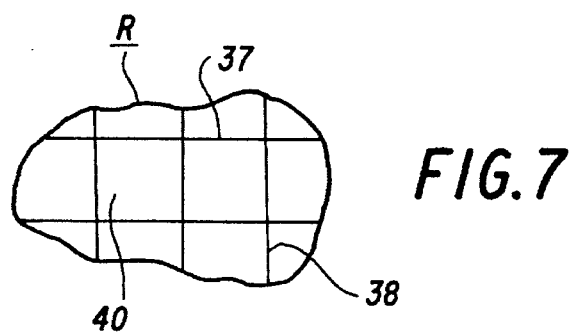
FIG. 7 is a fragmentary, plan view of a portion of a metal-sheet grid shown in detail in FIG. 6.
Figure 6:
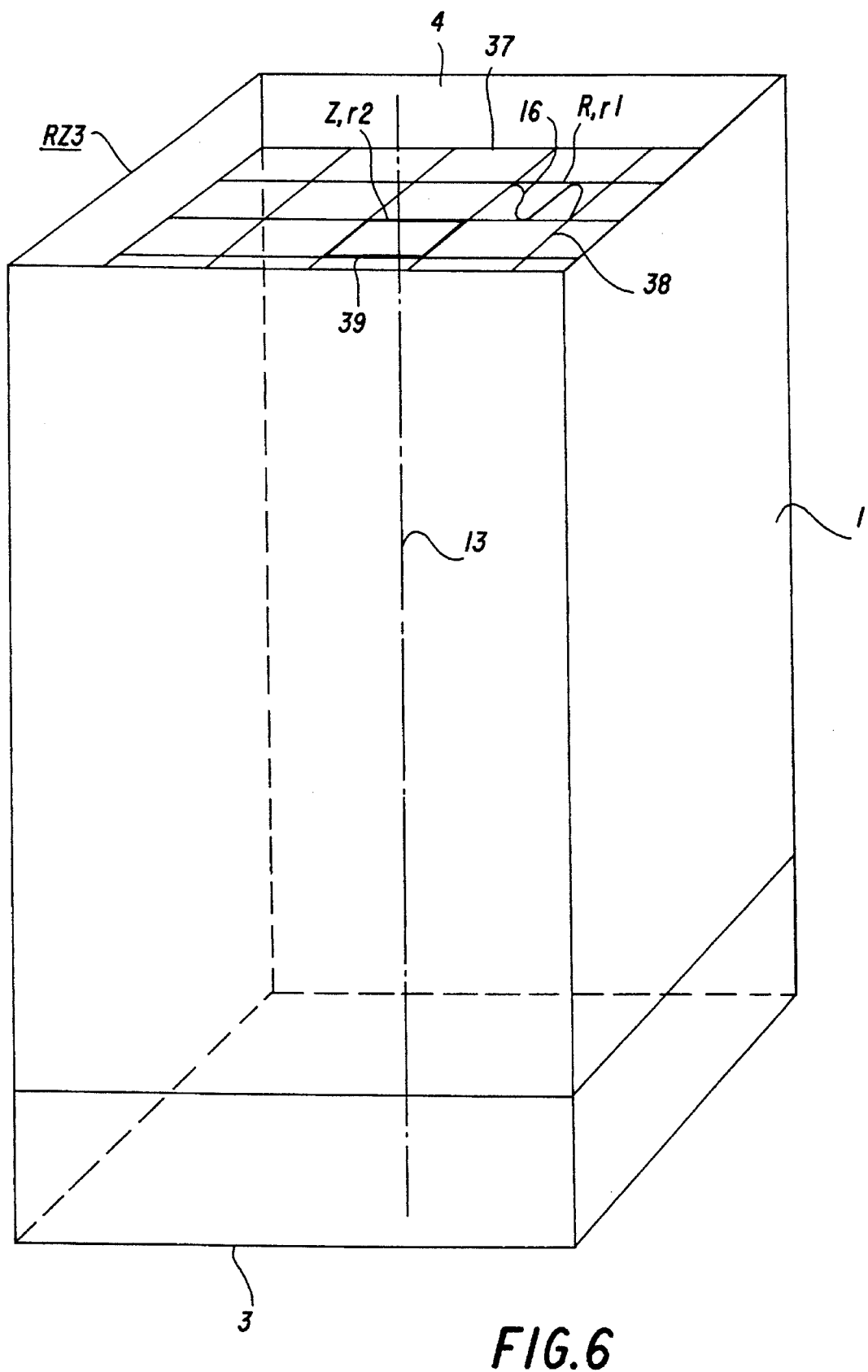
FIG. 6 is a perspective view of a further construction of the device with a block-type housing and catalytically coated metal sheets for a first channel which are accommodated therein and cross one another, and a central rectangular channel for forming the second channel.

FIG. 6 shows a third basic embodiment of a device RZ3 in which, in order to form the first channel system R and the first wall parts r1 as well as the second channel system Z and its second wall parts r2, flat metal sheets 37 are provided which extend in parallel to one another and to the longitudinal axis 13 of the housing and at a distance from one another inside the block-shaped housing 1. FIG. 6 shows that the metal sheets 37 cross further metal sheets 38 extending perpendicular thereto. The second channel system Z with its second wall parts r2 is formed by a channel 39 disposed in the interior of a rectangular grid formed by the sheets 37, 38. As is indicated at reference numeral 16, the rectangular grid cells may be further subdivided into subchannels by means of the corrugated or zigzag-shaped intermediate metal sheets 16. FIG. 7 shows a partial cross section with two metal sheets 37, 38 which cross one another and grid cells 40 formed by the latter.

Figure 8:
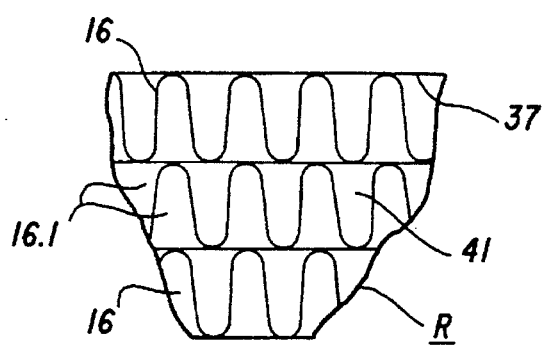
FIG. 8 is a fragmentary, cross-sectional view of a portion of a further embodiment, in which it is not metal sheets that cross one another which are used but only a group of metal sheets that are parallel to one another and which are held at a distance from, and joined to, one another by corrugated or zigzag-shaped intermediate metal sheets, in each case in simplified form and in some cases in a diagrammatic representation.

According to a variant of the example shown in FIGS. 6 and 7, which is shown in detail in FIG. 8, the metal sheets 38 are dispensed with, with the result that rectangular elongated grid cells 41 are formed and these are again subdivided into subchannels 16.1 by the corrugated or zigzag-shaped intermediate metal sheets 16. At the same time, the intermediate metal sheets 16 again provide the stable mechanical cohesion if they are used, for example, for a point-welded joint between themselves and the metal sheets 37. The illustration in FIGS. 6 to 8 is simplified and diagrammatic, like those in FIG. 5, because sufficient details are shown in FIGS. 1 to 4 and the latter naturally also apply analogously to the embodiment shown in FIGS. 5 and 6.

The channel walls r1, r2 are preferably formed entirely of metal because of the desired good heat conduction. The housing wall 1.1 may also be formed of a temperature-resistant plastic film which is coated with metal on its inner periphery. This makes it possible to reduce the radiation losses.

I claim:

1. A device for recombining and/or igniting the hydrogen contained in an $H_2$-air-steam mixture, comprising:

a) at least one first channel for a first partial flow of the $H_2$-air-steam mixture, said at least one first channel including a channel wall having a wall surface with a catalytic coating for recombining hydrogen and oxygen flowing past;

b) at least one second channel, in addition to said first channel for a second partial flow of the $H_2$-air-steam mixture in parallel with the first partial flow, said at least one second channel including a channel wall having at least one ignition element to be heated to an ignition temperature for igniting ignitable $H_2$-air-steam mixtures flowing past; and c) means for coupling heat produced in recombination processes in said first channel into said second channel; wherein said first channel has flow spaces in which said at least one ignition element is disposed, at least one of said first and second channel walls is metallically contacted, and said at least one ignition element has a point extending through said channel wall of said second channel into a channel cross section of said second channel.

2. The device according to claim 1, wherein said at least one ignition element is metallic.

3. The device according to claim 1, wherein said at least one ignition element is disposed in a heat-transmitting relationship with said channel walls for heating said at least one ignition element.

4. The device according to claim 1, wherein said at least one ignition element is in metallically conducting contact with said channel walls.

5. The device according to claim 1, wherein said second channel wall is in a heat-transmitting relationship with said first channel for transmitting quantities of heat produced during the recombination processes in said first channel to said second channel wall and preheating an $H_2$-air-steam mixture flowing through said second channel at said second channel wall no later than when it is ignited at said at least one ignition element.

6. The device according to claim 5, wherein said second channel wall is in heat-conducting contact with said first channel.

7. The device according to claim 1, wherein said at least one ignition element is a panel type ignition element being formed by said second channel wall.

8. The device according to claim 1, wherein said at least one ignition element is at least one wire coil.

9. The device according to claim 1, wherein said at least one ignition element is at least one pin or tube.

10. The device according to claim 3, wherein said first and second channels have inflow and outflow ends, and said at least one ignition element is at least one point-type ignition element in the form of wires having a catalytic surface making metallic contact with at least one of said first and second channel walls and being inserted beyond at least one of said inflow and outflow ends.

11. The device according to claim 10, wherein said wires are inserted upstream of said inflow ends of said first and second channels.

12. The device according to claim 10, wherein said wires are inserted downstream of said outflow ends of said first and second channels.

13. The device according to claim 10, wherein said wires are inserted upstream of said inflow ends of said first and second channels and downstream of said outflow ends of said first and second channels.

14. The device according to claim 1, including a hollow cylindrical housing wall having cylindrical end surfaces with inlet and outlet openings, and cylindrical metal sheets of different diameters being disposed coaxially and concentrically with one another inside said hollow cylindrical housing wall and forming said first channel.

15. The device according to claim 1, including a hollow cylindrical housing wall having a central housing axis, and metal sheets being wound in spirals and at a distance from one another surrounding the central housing axis inside said housing wall to form said first channel, said spirals having end surfaces, and said housing wall having inlet and outlet openings being disposed at said end surfaces of said spirals.

16. The device according to claim 14, wherein said metal sheets include an innermost cylindrical metal sheet with an inner periphery, and said second channel is bounded by the inner periphery of said innermost cylindrical metal sheet.

17. The device according to claim 15, wherein said spirals of said spirally wound metal sheets include an innermost spiral winding having an inner periphery bounding said second channel.

18. The device according to claim 1, including flat metal sheets forming a boundary of channels with rectangular cross sections to form said first channel.

19. The device according to claim 18, wherein said second channel is disposed in the interior of a rectangular grid.

20. The device according to claim 18, including a rectangular housing surrounding said first and second channels and having end surfaces forming inlet and outlet openings.

21. The device according to claim 19, including a rectangular housing surrounding said first and second channels and having end surfaces forming inlet and outlet openings.

22. The device according to claim 1, including corrugated or zigzag-shaped and catalytically coated metal insertion sheets being inserted into said first channel and subdividing said first channel into subchannels.

23. The device according to claim 1, wherein said second channel wall has a tubular or spiral construction increasing the surface of said second channel.

24. The device according to claim 23, including a housing having at least one inlet and at least one outlet opening for the $H_2$-air-steam mixture, and a lid covering said outlet opening at a vertical distance defining a free lateral outflow cross section for said first and second channels, said lid having flow guiding surfaces for promoting deflection of a flow from a vertical to a horizontal direction.

25. The device according to claim 1, including a housing having at least one inlet and at least one outlet opening for the $H_2$-air-steam mixture, and a flow guiding body disposed underneath said at least one inlet opening, said flow guiding body having flow guiding surfaces for deflecting an inflow from a lateral to a vertical direction.

* * * * *